United States Patent
Wu et al.

(10) Patent No.: US 8,605,303 B2
(45) Date of Patent: Dec. 10, 2013

(54) CONTENT-AWARE IMAGE QUALITY DEFECT DETECTION IN PRINTED DOCUMENTS

(75) Inventors: Wencheng Wu, Webster, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 453 days.

(21) Appl. No.: 13/008,557

(22) Filed: Jan. 18, 2011

(65) Prior Publication Data

US 2012/0182571 A1 Jul. 19, 2012

(51) Int. Cl.
*G06K 15/00* (2006.01)

(52) U.S. Cl.
USPC .......... 358/1.14; 358/1.9; 358/3.26; 358/448; 385/112; 385/170; 385/190; 385/199; 399/9

(58) Field of Classification Search
USPC ......... 358/1.14, 1.9, 3.26, 448; 385/112, 170, 385/190, 199; 399/9
See application file for complete search history.

(56) References Cited

U.S. PATENT DOCUMENTS

| | | | |
|---|---|---|---|
| 5,210,547 A | 5/1993 | Watanabe et al. | |
| 6,572,213 B2 | 6/2003 | Valero | |
| 6,695,435 B1 | 2/2004 | Cheng et al. | |
| 7,039,348 B2 | 5/2006 | Kerxhalli et al. | |
| 7,382,507 B2 * | 6/2008 | Wu | 358/523 |
| 7,424,169 B2 | 9/2008 | Viassolo et al. | |
| 7,427,118 B2 | 9/2008 | Mizes et al. | |
| 7,455,387 B2 | 11/2008 | Cunnington et al. | |
| 7,690,746 B2 | 4/2010 | Mantell et al. | |
| 7,905,567 B2 | 3/2011 | Orsley | |
| 2002/0141769 A1 * | 10/2002 | Phillips | 399/38 |
| 2004/0027618 A1 | 2/2004 | Nakamura et al. | |
| 2005/0286742 A1 * | 12/2005 | Rasmussen et al. | 382/112 |
| 2008/0303854 A1 | 12/2008 | Mizes et al. | |
| 2009/0262380 A1 | 10/2009 | Puigardeu et al. | |
| 2010/0021069 A1 | 1/2010 | Fan et al. | |
| 2010/0123752 A1 | 5/2010 | Eun et al. | |
| 2010/0124362 A1 * | 5/2010 | Wu et al. | 382/112 |
| 2010/0149560 A1 | 6/2010 | Wu | |
| 2010/0214580 A1 | 8/2010 | Burry et al. | |
| 2010/0238220 A1 | 9/2010 | Yeh et al. | |
| 2010/0245454 A1 | 9/2010 | Ramakrishnan et al. | |
| 2010/0253732 A1 | 10/2010 | Sjolander et al. | |

* cited by examiner

*Primary Examiner* — Jacky X Zheng
(74) *Attorney, Agent, or Firm* — Maginot, Moore & Beck, LLP

(57) ABSTRACT

A method has been developed for detecting defects in printed images. The method includes operating a printer to print a first printed image and a second image, where the second image is a duplicate of the first printed image. The method further includes generating image data that correspond to the first printed image and the second printed image, and identifying image defects using differences between the image data generated for the first image and the image data generated for the second image.

12 Claims, 6 Drawing Sheets

CONTENT-AWARE IMAGE QUALITY DEFECT DETECTION IN PRINTED DOCUMENTS

TECHNICAL FIELD

This disclosure relates generally to devices that generate printed images on an image receiving member, and more particularly, to such imaging devices that identify defects in the printed images.

BACKGROUND

Printing systems form images on image receiving members including paper and other print media. Different printing techniques including laser printing, inkjet printing, offset printing, dye-sublimation printing, thermal printing, and the like may be used to produce printed documents. In particular, inkjet imaging devices eject liquid ink from printheads to form images on an image receiving member. The printheads include a plurality of inkjets that are arranged in some type of array. Each inkjet has a thermal or piezoelectric actuator that is coupled to a printhead controller. The printhead controller generates firing signals that correspond to digital data for images. The frequency and amplitude of the firing signals correspond to the selective activation of the printhead actuators. The printhead actuators respond to the firing signals by ejecting ink drops onto an image receiving member to form an ink image that corresponds to the digital image used to generate the firing signals.

Throughout the life cycle of printing systems, the image generating ability of the system requires evaluation and, if the images contain detectable defects, correction. Various defects in the image generating process affect ink image quality. These defects include transient defects that occur during a printing process for a comparatively short time period. While various techniques exist to measure image quality and detect defects, the transient defects may change too quickly for the existing techniques to detect the defects effectively and enable the printing system to take corrective actions. For example, image quality defects are often detected by printing known test patterns on a print medium and analyzing the test patterns for image defects. Typical test patterns include one or more predefined shapes such as lines, dashes, and geometric figures, contone or halftoned areas that enable a printer to detect image defects and to calibrate one or more components to correct the defects. These test patterns present several disadvantages since they consume print media that could otherwise be used for printing images, and since they must be separated from the printed customer prints during or after the print job. Additionally, transient defects may occur between printing test patterns and avoid detection in the test pattern image data. Being able to detect transient image quality defects from customer generated images without requiring predetermined test patterns or knowledge of the image content would be useful.

SUMMARY

In one embodiment, a method for identifying defects in a printed image has been developed. The method includes operating a printer to form a first printed image and a second printed image on at least one image receiving member, generating first image data corresponding to the first printed image, generating second image data corresponding to the second printed image, generating difference data corresponding to a difference between data corresponding to the first image data and data corresponding to the second image data, and identifying a defect in the second printed image from the difference data. The second printed image is a duplicate of the first printed image.

In another embodiment, a system for identifying image defects in images produced by a printer has been developed. The system includes a printer configured to form a first printed image and a second printed image on at least one image receiving member, an optical detector configured to generate digital image data corresponding to the second printed image from light reflected by the second image, and a controller operatively connected to the optical detector. The controller is configured to generate image data corresponding to a difference between image data corresponding to the first printed image and the image data corresponding to the second printed image and to identify an image defect in the second printed image from the image data corresponding to the difference between the image data corresponding to the first printed image and the image data corresponding to the second printed image. The second printed image is a duplicate of the first printed image.

BRIEF DESCRIPTION OF THE DRAWINGS

The foregoing aspects and other features of a system and method that identify transient image defects in image data are explained in the following description, taken in connection with the accompanying drawings.

DETAILED DESCRIPTION

Figure 1:
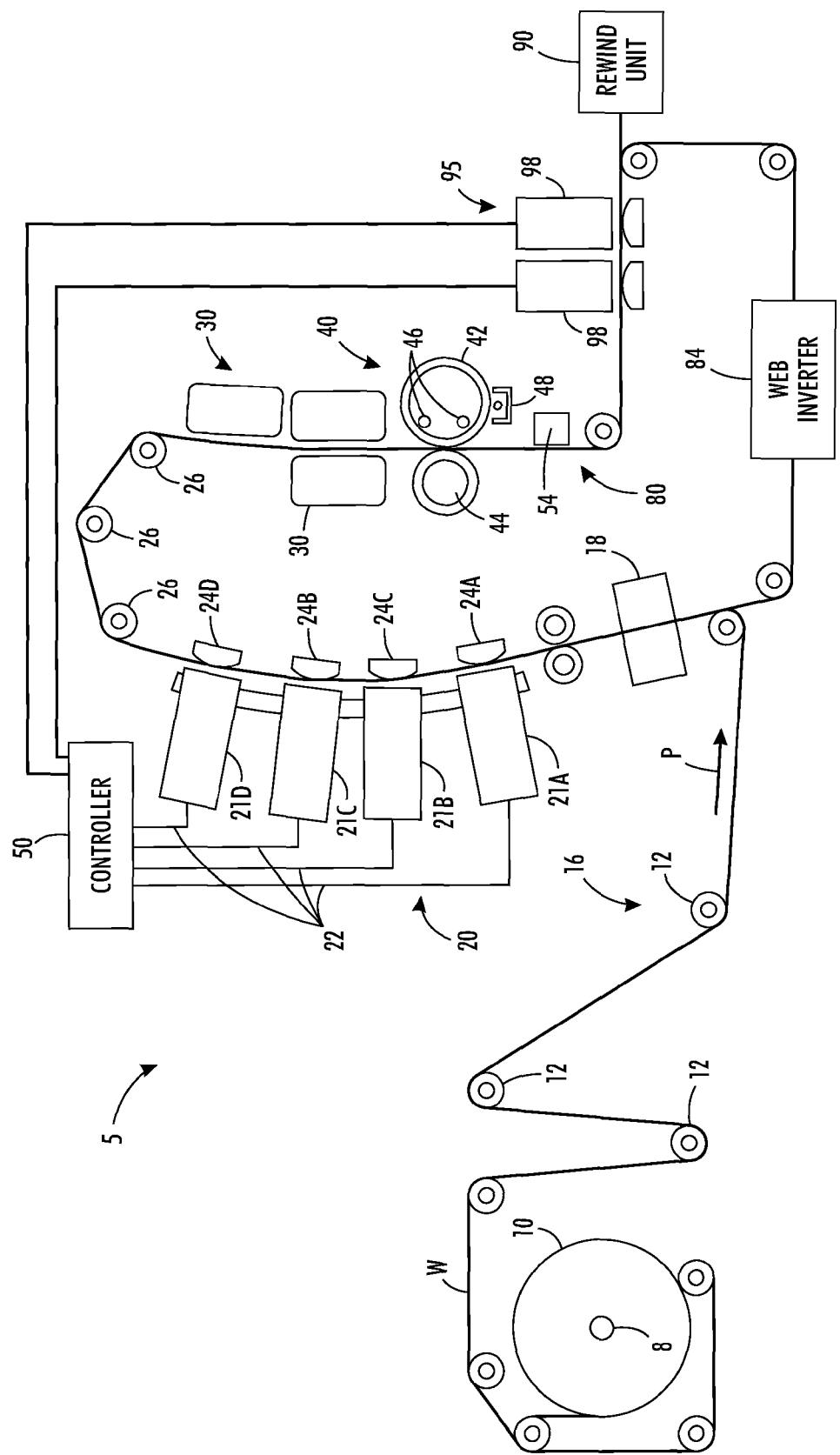
FIG. 1 is a schematic view of a web imaging system.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that forms a printed image on media. Examples of printers include, but are not limited to, digital copiers, bookmaking machines, facsimile machines, multi-function machines, or the like. The term "image receiving member" encompasses any print medium including paper, as well as indirect imaging members including imaging drums or belts. The image receiving member travels in a process direction, with a cross-process direction being perpendicular to the process direction. The term "page" refers to an area of the surface of an image receiving member that receives a printed image that corresponds to one page of a document. A single sheet of paper may have printed images corresponding to different pages formed on each side of the sheet. A continuous media web may have a plurality of pages formed on its surface with a predetermined space left between adjacent printed images of each page to facilitate cutting the web into individual sheets.

The term "image data" refers to a digital representation of a printed image suitable for processing by a digital device such as a microcontroller, processor, application specific integrated circuit (ASIC), and the like. The image data may be generated from a print image formed on an image receiving member, or may be generated by a digital device such as a camera, scanner, computer, or the like. The terms "duplicate image" and "duplicate image data" refer to two or more images or image data generated from the images that are identified as having image data that correspond to the same or similar printed images. Duplicate images need not be exactly identical to one another. For example, duplicate images may include personalized documents such as bills or advertising materials that include personalized information, such as text, printed on a single image such a corporate logo or letterhead. The term "delta image data" refers to image data corresponding to the difference between image data for a reference image and image data corresponding to a duplicate of the reference image. The delta image data indicate the magnitudes and locations of differences between the reference image and the duplicate image. The term "print job" refers to a series of data sent to a printer that specify various job parameters, commands, and image data corresponding to one or more images for the printer to generate. The image data for each image specify various image elements, such as text and graphics. In some embodiments, a single print job may instruct the printer to produce multiple copies of a single document, and in other embodiments a plurality of print jobs may each instruct the printer to produce a single copy of the same document.

The surface of an image receiving member is made up of a grid-like pattern of potential drop locations, sometimes referred to as pixels. The term "gray level" refers to a numeric level assigned to light reflected from a pixel position on the image receiving member, where a higher gray level number corresponds more closely to white and a lower number corresponds more closely to black.

The term "profile" refers to a quantitative representation of the detected color intensity level for a linear arrangement of pixels arranged in the process direction that includes one or more numeric values. An example profile may be an average of the color intensity level measured for a predetermined number of pixels in the process direction. In image data having multiple color channels, the color intensity value identified in each color channel may have a numerical level assigned where a higher color intensity value corresponds more closely to a pure representation of the color in the color channel, and a lower number corresponds more closely to black.

As used in this document, the words "calculate" and "identify" include the operation of a circuit comprised of hardware, software, or a combination of hardware and software that reaches a result based on one or more measurements of physical relationships with accuracy or precision suitable for a practical application. Also, the description presented below is directed to a system for operating an inkjet printer to print images on an image substrate and to analyze digital image data representing the printed images to detect transient image defects. The reader should also appreciate that the principles set forth in this description are applicable to similar printers and digital image analyzers that may be adapted for use in any printer that generates images with dots of marking material.

Referring to FIG. 1, an inkjet imaging system 5 is shown that has been configured to evaluate image data detected from images formed on the surface of an image receiving member during printing operations. For the purposes of this disclosure, the imaging apparatus is in the form of an inkjet printer that employs one or more inkjet printheads and an associated solid ink supply. However, the methods described herein are applicable to any of a variety of other imaging apparatuses that use inkjet ejectors in printheads to form images.

The imaging system includes a print engine to process the image data before generating the control signals for the inkjet ejectors for ejecting colorants. Colorants may be ink, or any suitable substance that includes one or more dyes or pigments and that may be applied to the selected media. The colorant may be black, or any other desired color, and a given imaging apparatus may be capable of applying a plurality of distinct colorants to the media. The media may include any of a variety of substrates, including plain paper, coated paper, glossy paper, or transparencies, among others, and the media may be available in sheets, rolls, or another physical formats.

Direct-to-sheet, continuous-media, phase-change inkjet imaging system 5 includes a media supply and handling system configured to supply a long (i.e., substantially continuous) web of media W of "substrate" (paper, plastic, or other printable material) from a media source, such as spool of media 10 mounted on a web roller 8. For simplex printing, the printer is comprised of feed roller 8, media conditioner 16, printing station 20, printed web conditioner 80, coating station 95, and rewind unit 90. For duplex operations, the web inverter 84 is used to flip the web over to present a second side of the media to the printing station 20, printed web conditioner 80, and coating station 95 before being taken up by the rewind unit 90. Duplex operations may also be achieved with two printers arranged serially with a web inverter interposed between them. In this arrangement, the first printer forms and fixes an image on one side of a web, the inverter turns the web over, and the second printer forms and fixes an image on the second side of the web. In the simplex operation, the media source 10 has a width that substantially covers the width of the rollers over which the media travels through the printer. In duplex operation, the media source is approximately one-half of the roller widths as the web travels over one-half of the rollers in the printing station 20, printed web conditioner 80, and coating station 95 before being flipped by the inverter 84 and laterally displaced by a distance that enables the web to travel over the other half of the rollers opposite the printing station 20, printed web conditioner 80, and coating station 95 for the printing, conditioning, and coating, if necessary, of the reverse side of the web. The rewind unit 90 is configured to wind the web onto a roller for removal from the printer and subsequent processing.

The media may be unwound from the source 10 as needed and propelled by a variety of motors, not shown, that rotate one or more rollers. The media conditioner includes rollers 12 and a pre-heater 18. The rollers 12 control the tension of the unwinding media as the media moves along a path through the printer. In alternative embodiments, the media may be transported along the path in cut sheet form in which case the media supply and handling system may include any suitable device or structure that enables the transport of cut media sheets along a desired path through the printer. The pre-heater 18 brings the web to an initial predetermined temperature that is selected for desired image characteristics corresponding to the type of media being printed as well as the type, colors, and number of inks being used. The pre-heater 18 may use contact, radiant, conductive, or convective heat to bring the media to a target preheat temperature, which in one practical embodiment, is in a range of about 30° C. to about 70° C.

The media is transported through a printing station 20 that includes a series of color modules or units 21A, 21B, 21C, and 21D, each color module effectively extends across the width of the media and is able to eject ink directly (i.e., without use of an intermediate or offset member) onto the moving media. As is generally familiar, each of the printheads may eject a single color of ink, one for each of the colors typically used in color printing, namely, cyan, magenta, yellow, and black (CMYK). The controller 50 of the printer receives velocity data from encoders mounted proximately to rollers positioned on either side of the portion of the path opposite the four printheads to calculate the linear velocity and position of the web as the web moves past the printheads. The controller 50 uses these data to generate timing signals for actuating the inkjet ejectors in the printheads to enable the printheads to eject four colors of ink with appropriate timing and accuracy for registration of the differently color patterns to form color images on the media. The inkjet ejectors actuated by the firing signals corresponds to image data processed by the controller 50. The image data may be transmitted to the printer, generated by a scanner (not shown) that is a component of the printer, or otherwise generated and delivered to the printer. In various possible embodiments, a color module for each primary color may include one or more printheads; multiple printheads in a module may be formed into a single row or multiple row array; printheads of a multiple row array may be staggered; a printhead may print more than one color; or the printheads or portions thereof can be mounted movably in a direction transverse to the process direction P, also known as the cross-process direction, such as for spot-color applications and the like.

Each of the color modules 21A-21D includes at least one electrical motor configured to adjust the printheads in each of the color modules in the cross-process direction across the media web. In a typical embodiment, each motor is an electromechanical device such as a stepper motor or the like. As used in this document, electrical motor refers to any device configured to receive an electrical signal and produce mechanical movement. Such devices include, but are not limited to, solenoids, stepper motors, linear motors, and the like. In a practical embodiment, a print bar actuator is connected to a print bar having two or more printheads. The print bar actuator is configured to reposition the print bar by sliding the print bar in the cross-process direction across the media web. Printhead actuators may also be connected to individual printheads within each of color modules 21A-21D. These printhead actuators are configured to reposition an individual printhead by sliding the printhead in the cross-process direction across the media web.

The printer may use "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. In one embodiment, the phase change ink melting temperature is approximately 70° C. to 140° C. In alternative embodiments, the ink utilized in the printer may comprise UV curable gel ink. Gel ink may also be heated before being ejected by the inkjet ejectors of the printhead. As used herein, liquid ink refers to melted solid ink, heated gel ink, or other known forms of ink, such as aqueous inks, ink emulsions, ink suspensions, ink solutions, or the like.

Associated with each color module is a backing member 24A-24D, typically in the form of a bar or roll, which is arranged substantially opposite the printhead on the back side of the media. Each backing member is used to position the media at a predetermined distance from the printhead opposite the backing member. Each backing member may be configured to emit thermal energy to heat the media to a predetermined temperature which, in one practical embodiment, is in a range of about 40° C. to about 60° C. The various backer members may be controlled individually or collectively. The pre-heater 18, the printheads, backing members 24 (if heated), as well as the surrounding air combine to maintain the media along the portion of the path opposite the printing station 20 in a predetermined temperature range of about 40° C. to 70° C.

As the partially-imaged media moves to receive inks of various colors from the printheads of the printing station 20, the temperature of the media is maintained within a given range. Ink is ejected from the printheads at a temperature typically significantly higher than the receiving media temperature. Consequently, the ink heats the media. Therefore other temperature regulating devices may be employed to maintain the media temperature within a predetermined range. For example, the air temperature and air flow rate behind and in front of the media may also impact the media temperature. Accordingly, air blowers or fans may be utilized to facilitate control of the media temperature. Thus, the media temperature is kept substantially uniform for the jetting of all inks from the printheads of the printing station 20. Temperature sensors (not shown) may be positioned along this portion of the media path to enable regulation of the media temperature. These temperature data may also be used by systems for measuring or inferring (from the image data, for example) how much ink of a given primary color from a printhead is being applied to the media at a given time.

Following the printing zone 20 along the media path are one or more "mid-heaters" 30. A mid-heater 30 may use contact, radiant, conductive, and/or convective heat to control a temperature of the media. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to 0° C. to 20° C. above the temperature of the spreader.

Following the mid-heaters 30, a fixing assembly 40 is configured to apply heat and/or pressure to the media to fix the images to the media. The fixing assembly may include any suitable device or apparatus for fixing images to the media including heated or unheated pressure rollers, radiant heaters, heat lamps, and the like. In the embodiment of the FIG. 1, the fixing assembly includes a "spreader" 40, that applies a predetermined pressure, and in some implementations, heat, to the media. The function of the spreader 40 is to take what are essentially droplets, strings of droplets, or lines of ink on web W and smear them out by pressure and, in some systems, heat, so that spaces between adjacent drops are filled and image solids become uniform. In addition to spreading the ink, the spreader 40 may also improve image permanence by increasing ink layer cohesion and/or increasing the ink-web adhesion. The spreader 40 includes rollers, such as image-side roller 42 and pressure roller 44, to apply heat and pressure to the media. Either roll can include heat elements, such as heating elements 46, to bring the web W to a temperature in a range from about 35° C. to about 80° C. In alternative embodiments, the fixing assembly may be configured to spread the ink using non-contact heating (without pressure)

of the media after the print zone. Such a non-contact fixing assembly may use any suitable type of heater to heat the media to a desired temperature, such as a radiant heater, UV heating lamps, and the like.

In one practical embodiment, the roller temperature in spreader 40 is maintained at a temperature to an optimum temperature that depends on the properties of the ink such as 55° C.; generally, a lower roller temperature gives less line spread while a higher temperature causes imperfections in the gloss. Roller temperatures that are too high may cause ink to offset to the roll. In one practical embodiment, the nip pressure is set in a range of about 500 to about 2000 psi lbs/side. Lower nip pressure gives less line spread while higher pressure may reduce pressure roller life.

The spreader 40 may also include a cleaning/oiling station 48 associated with image-side roller 42. The station 48 cleans and/or applies a layer of some release agent or other material to the roller surface. The release agent material may be an amino silicone oil having viscosity of about 10-200 centipoises. Only small amounts of oil are required and the oil carried by the media is only about 1-10 mg per A4 size sheet. In one possible embodiment, the mid-heater 30 and spreader 40 may be combined into a single unit, with their respective functions occurring relative to the same portion of media simultaneously. In another embodiment the media is maintained at a high temperature as it is printed to enable spreading of the ink.

The coating station 95 applies a clear ink to the printed media using one or more clear ink ejectors 98. This clear ink helps protect the printed media from smearing or other environmental degradation following removal from the printer. The overlay of clear ink acts as a sacrificial layer of ink that may be smeared and/or offset during handling without affecting the appearance of the image underneath. The coating station 95 may apply the clear ink with either a roller or a printhead 98 ejecting the clear ink in a pattern. Clear ink for the purposes of this disclosure is functionally defined as a substantially clear overcoat ink that has minimal impact on the final printed color, regardless of whether or not the ink is devoid of all colorant. In one embodiment, the clear ink utilized for the coating ink comprises a phase change ink formulation without colorant. Alternatively, the clear ink coating may be formed using a reduced set of typical solid ink components or a single solid ink component, such as polyethylene wax, or polywax. As used herein, polywax refers to a family of relatively low molecular weight straight chain polyethylene or polymethylene waxes. Similar to the colored phase change inks, clear phase change ink is substantially solid at room temperature and substantially liquid or melted when initially jetted onto the media. The clear phase change ink may be heated to about 100° C. to 140° C. to melt the solid ink for jetting onto the media.

Following passage through the spreader 40 the printed media may be wound onto a roller for removal from the system (simplex printing) or directed to the web inverter 84 for inversion and displacement to another section of the rollers for a second pass by the printheads, mid-heaters, spreader, and coating station. The duplex printed material may then be wound onto a roller for removal from the system by rewind unit 90. Alternatively, the media may be directed to other processing stations that perform tasks such as cutting, binding, collating, and/or stapling the media or the like.

Operation and control of the various subsystems, components and functions of the device 5 are performed with the aid of the controller 50. The controller 50 may be implemented with general or specialized programmable processors that execute programmed instructions. The instructions and data required to perform the programmed functions may be stored in memory associated with the processors or controllers. The processors, their memories, and interface circuitry configure the controllers and/or print engine to perform the functions, such as the electrical motor calibration function, described below. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits. Controller 50 may be operatively connected to the print bar and printhead motors of color modules 21A-21D in order to adjust the positions of the printhead bars and printheads in the cross-process direction across the media web. Controller 50 is further configured to determine sensitivity and backlash calibration parameters that are measured for each of the printhead and print bar motors, and to store these parameters in the memory. In response to the controller 50 detecting misalignment that requires movement of a print bar or printhead, controller 50 uses the calibration parameter corresponding to the required direction of movement for the appropriate motor to determine a number of steps that the controller commands the motor to rotate to achieve movement of the print bar or printhead in the required direction.

The imaging system 5 may also include an optical imaging system 54 that is configured in a manner similar to that described above for the imaging of the printed web. The optical imaging system is configured to detect, for example, the presence, intensity, and/or location of ink drops jetted onto the receiving member by the inkjets of the printhead assembly. The optical imaging system may include an array of optical detectors mounted to a bar or other longitudinal structure that extends across the width of an imaging area on the image receiving member. In one embodiment in which the imaging area is approximately twenty inches wide in the cross process direction and the printheads print at a resolution of 600 dpi in the cross process direction, over 12,000 optical detectors are arrayed in a single row along the bar to generate a single scanline of digital image data across the imaging member. The optical detectors are configured in association in one or more light sources that direct light towards the surface of the image receiving member. The optical detectors receive the light generated by the light sources after the light is reflected from the image receiving member. The magnitude of the electrical signal generated by an optical detector in response to light being reflected by the bare surface of the image receiving member is larger than the magnitude of a signal generated in response to light reflected from a drop of ink on the image receiving member. This difference in the magnitude of the generated signal may be used to identify the positions of ink drops on an image receiving member. The reader should note, however, that lighter colored inks, such as yellow, cause optical detectors to generate lower contrast signals with respect to the signals received from unlinked portions than darker colored inks, such as black. The magnitudes of the electrical signals generated by the optical detectors may be converted to digital values by an appropriate analog/digital converter.

The imaging system 5 of FIG. 1 is merely illustrative of one embodiment of an imaging system that may detect transient image defects in printed images. Alternative imaging systems including, but not limited to, drop on demand indirect imaging systems, sheet fed imaging systems, and the like may be used as well.

Figure 2:
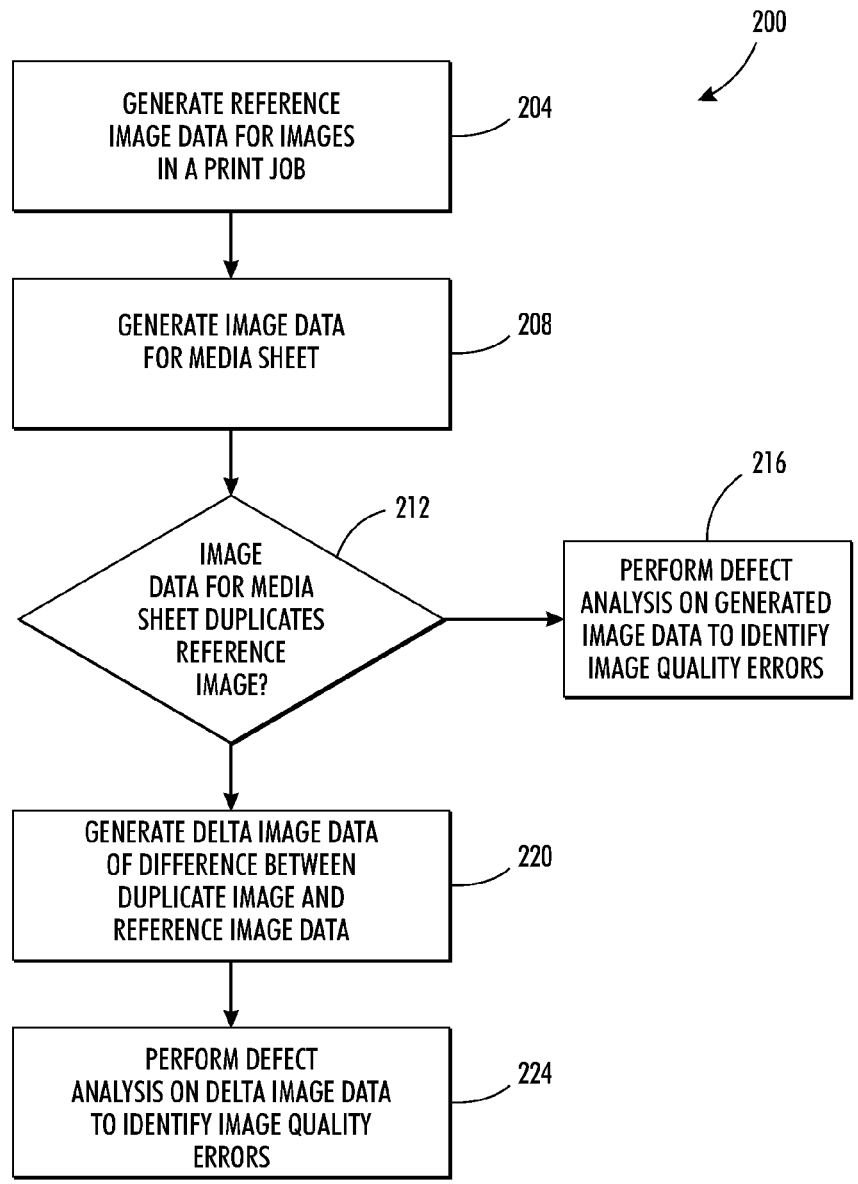
FIG. 2 is a block diagram of a process for generating delta image data that correspond to the differences between reference image data and image data generated from a printed image for use in image defect analysis.

FIG. 2 depicts a process 200 for detecting image defects in duplicate printed images generated by a printer. Process 200 generates a set of reference image data for one or more printed images generated during a print job (block 204). In various imaging operations, a set of printed images may be generated multiple times. For example, a print job may produce 10,000 copies of a three page document, with duplicate images of the three pages generated once for each copy of the document. A reference image refers to a set of image data corresponding to the printed image formed on one of the pages in the print job. In some embodiments, the printer may use an optical imaging system to generate reference image data from the first set of images generated for comparison with all subsequent duplicate images. In another embodiment, the printer may generate reference image data for each of the most recent copy of the duplicate images in the print job, and retain the generated image reference data for comparison with the next duplicate image that the printer generates. In this embodiment, the printer replaces the reference image data each time the printer generates image data for a duplicate page and after the printer detects any image defects in the duplicate image. In still another embodiment, the printer may use the original electronic version of the image data received with the print job to compare with image data generated from the printed images after the printer has formed the printed images on the image media.

In addition to generating reference image data for printed images in a print job, process 200 generates image data for each media page after the printer forms printed images on the image receiving member (block 208). In one embodiment, an optical imaging system, such as optical imaging system 54 described above, generates image data from the images formed on the print medium. Process 200 determines if the generated image data for the page is a duplicate of reference image data (block 212). One method for identifying whether image data for a page is a duplicate of reference image data is described in more detail below with reference to FIG. 4. In some embodiments, process 200 identifies duplicate pages with reference to the full image formed on each media sheet. For example, in a print job producing multiple copies of a three page document, the corresponding first, second and third pages of each copy are full-page duplicates. In other embodiments, process 200 may identify duplicate images that may occupy a portion of a page, while other portions of the page are not duplicates. For example, in many documents, a duplicate header image is formed at the top of each page in a print job, even if other portions of the pages do not duplicate one another.

If the generated image data for a page is not a duplicate of one of the reference images, then various image defect analysis techniques may be performed on the generated image data (block 216). One such image defect analysis technique is described in co-pending U.S. patent application Ser. No. 12/906,694 entitled "System and Method for Detecting Missing Inkjets in an Inkjet Printer Using Image Data of Printed Documents Without A Priori Knowledge Of The Documents," filed on Oct. 18, 2010, and which has the same assignee as the present application. The image defect analysis for a non-duplicate image is appropriate for pages that do not duplicate reference image data. Additionally, in embodiments where the reference image data is generated from the first copy of each page, the image defect analysis may identify defects in the reference images that may then be corrected prior to comparing the reference image data to image data generated from duplicate images.

If the generated image data for a page is a duplicate of reference image data (block 212), process 200 generates delta image data that correspond to the differences between the reference image data and the duplicate image data generated from the page (block 220). One method for generating the delta image data includes calculating an absolute value of the difference between the gray level values between each of the corresponding pixels in the reference image data and the generated image data. In this example, each pixel in the delta image data has a gray level of zero for pixels that match one another in the reference image data and generated image data, and a gray level corresponding to the difference between the gray level values for pixels that do not match one another in the reference image data and generated image data. For multi-color printers, the reference image data and generated image data may include multiple color channels, such as red, green, and blue (RGB) channels, and process 200 may generate delta image data for each of the color channels.

Another method for generating the delta image data applies a filter to the differences generated between the reference image data and the duplicate image data. The filter is configured to reduce the effect of noise in the image data that may be generated by the optical detectors. In one embodiment, a filter applied to the difference data sets any difference that falls below a predetermined threshold to zero to reduce the effects of noise. For example, in image data having 256 gray levels for each pixel, a difference between the image data for the reference image and the duplicate image having an absolute value of less than 5 may be set to 0, while differences that are greater than or equal to 5 remain unchanged. Various other filtering techniques, including multi-stage filtering may also be applied to reduce the effects of noise in the generated image data. Additionally, different filter parameters or filtering techniques may be applied to each color channel in multi-color image data.

Process 200 performs defect analysis on the delta image data (block 224). One or more defect analysis techniques may be applied to identify different types of image defects, including detection of missing ink ejectors in one or more printheads. In one embodiment, the same defect analysis techniques described above with reference to block 216 may detect image defects using the delta image data. The generated delta image data removes pixels having the same gray level values in the reference image and duplicate image from consideration in detecting image defects, removing duplicated image data that may reduce the accuracy of error detection. The non-zero gray levels in the delta image data indicate pixels locations where the duplicate image deviates from the reference image. Thus, applying image defect detection techniques to the delta image data increases the accuracy of detecting transient defects that the same defect detection technique may fail to identify in the duplicate image data.

Figure 5:
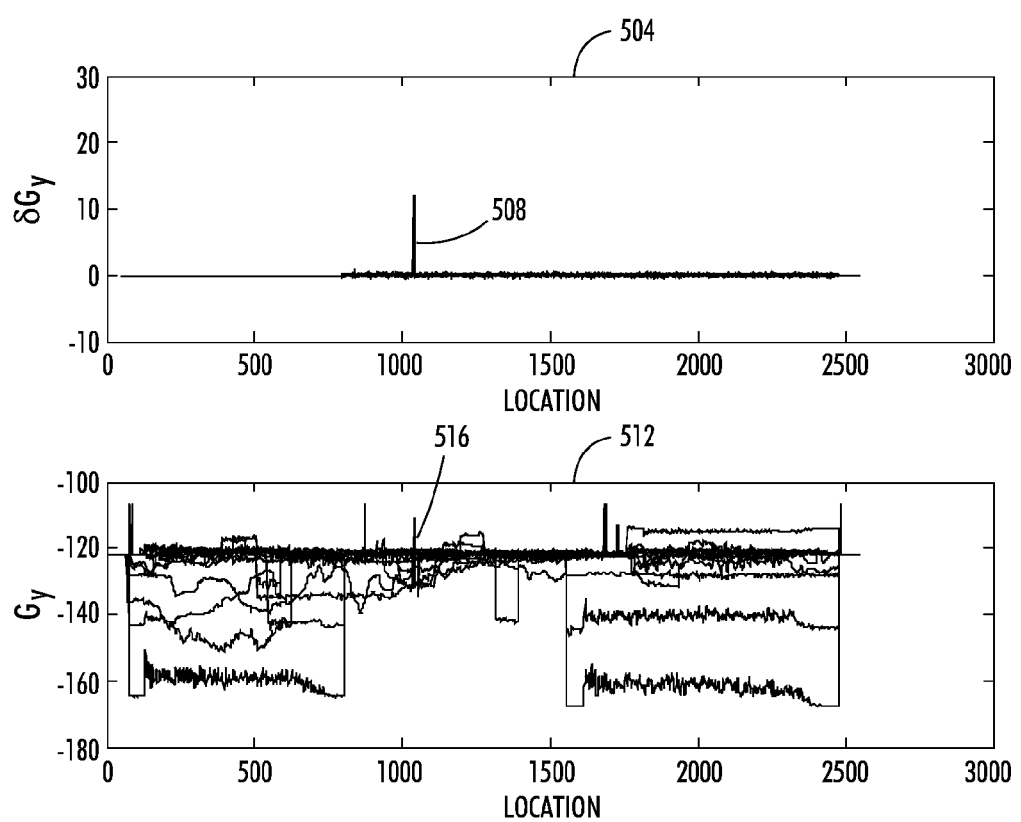
FIG. 5 is a diagram showing grey level profiles corresponding to image data and delta image data.

FIG. 5 depicts an example of color intensity profiles in the yellow color channel for a single row of pixels in a delta image data set 504 and a corresponding duplicate image data set 512. In each graph, the x-axis represents a pixel location in the cross-process direction on the image receiving member, and the y-axis represents detected color intensity values for each pixel. The graph 512 representing the duplicate image data shows multiple lines corresponding to various individual colors present in the duplicate image data. In the example of FIG. 5, a yellow ink ejector at pixel position 1038 experiences a transient defect. The reference image has one color intensity value for pixel 1038, while the duplicate image data includes a different color intensity value. The delta image data set 504 shows the difference between the reference and duplicate image data 508, while the remaining values in the delta image data are zero since the remaining image data in the reference image and duplicate image match at the remaining pixel locations.

While the color intensity level shown in the duplicate image data set 512 also shows a deviation 516 in at yellow pixel position 1038, the various color intensity levels of pixels surrounding the defect make identification of the defect in the duplicate image data more difficult. The defect may be missed, known as a false negative error in identifying defects. Alternatively, if the defect detection technique is sensitive enough to identify the defect at pixel location 1038, then the technique may misidentify defects at other pixel locations, known as a false positive error in identifying defects. Using the delta image data set reduces the noise in image data that may cause false positive errors, enabling the defect detection techniques to operate with greater sensitivity that enables accurate identification of transient defects.

Figure 3:
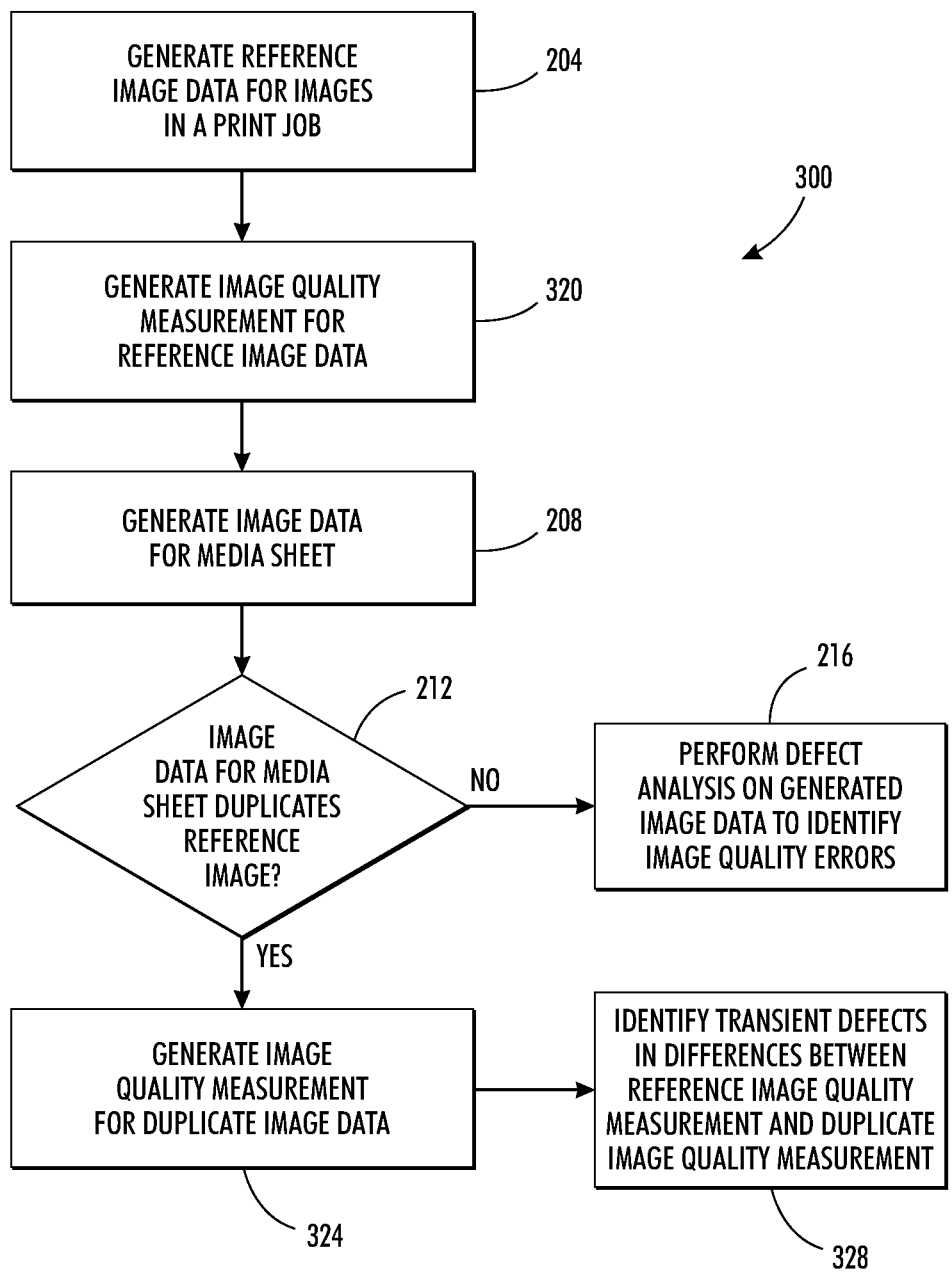
FIG. 3 is a block diagram of a process for generating an image quality measurement for a reference image and for a duplicate image for use in identifying image defects.

FIG. 3 depicts an alternative process 300 for identifying image quality defects in duplicate image data. Process 300 generates reference image data (block 204) in the same manner as described above in FIG. 2. Process 300 generates one or more image quality measurements for the reference image data (block 320). One such image quality measurement identifies the amplitude of banding in contone and halftone regions of an image. A contone region in an image is a region where various colors are produced using ink drops of various colors and drop sizes that are placed at a single location to produce another color. For example, in a CMYK printer, a contone production of an orange color may include a yellow ink drop of a first size onto which a magenta ink drop of a smaller second size has been ejected. The contone technique differs from a halftone technique where multiple individual ink drops of different colors are positioned in proximity to one another to produce another color. In both contone and halftone regions, the image may include visible bands of color resulting from defects in applying the different ink colors to the image receiving member. In addition to generating image quality measurements for banding, process 300 may generate various other image quality measurements using known techniques for the reference image data.

As additional pages are printed, process 300 generates image data for each page (block 208) and identifies whether the generated image data duplicates one of the reference images (block 212) in the same manner as discussed above in FIG. 2. In cases where the generated image data do not duplicate a reference image, process 300 may perform defect analysis on the generated image data (block 216). In situations where the generated image data duplicates reference image data, process 300 generates an image quality measurement for the duplicate image in the same manner as for the reference image (block 324). Process 300 identifies transient defects in the duplicate image data by comparing the image quality measurements of the reference image to the image quality measurements of the duplicate image (block 328). In the example of image banding discussed above, if the image quality measurement for the duplicate image indicates that the amplitude of banding has deviated beyond a predetermined threshold above or below the amplitude of banding in the reference image data, then the printer may take corrective action to maintain image quality between the reference image and the duplicate images.

The examples of FIG. 2 and FIG. 3 are illustrative of two processes for identifying transient errors in duplicate image data. Additional image processing techniques may be used with both depicted embodiments. In one example, one or both of the reference image data and duplicate image data undergo pre-processing prior to generating the delta image data or image quality measurements. One example of preprocessing includes generating one-dimensional profiles for the reference image data and the duplicate image data. The one dimensional profiles are then compared to identify streak errors in the duplicate image. Another preprocessing operation performs noise-reduction filtering such as a blur to remove halftone structure present in the reference image data and duplicate image data. The delta image data are generated from the filtered reference image data and filtered duplicate image data. Various preprocessing techniques improve detection of particular transient image errors and reduce the effects of noise in detected image data.

Figure 4:
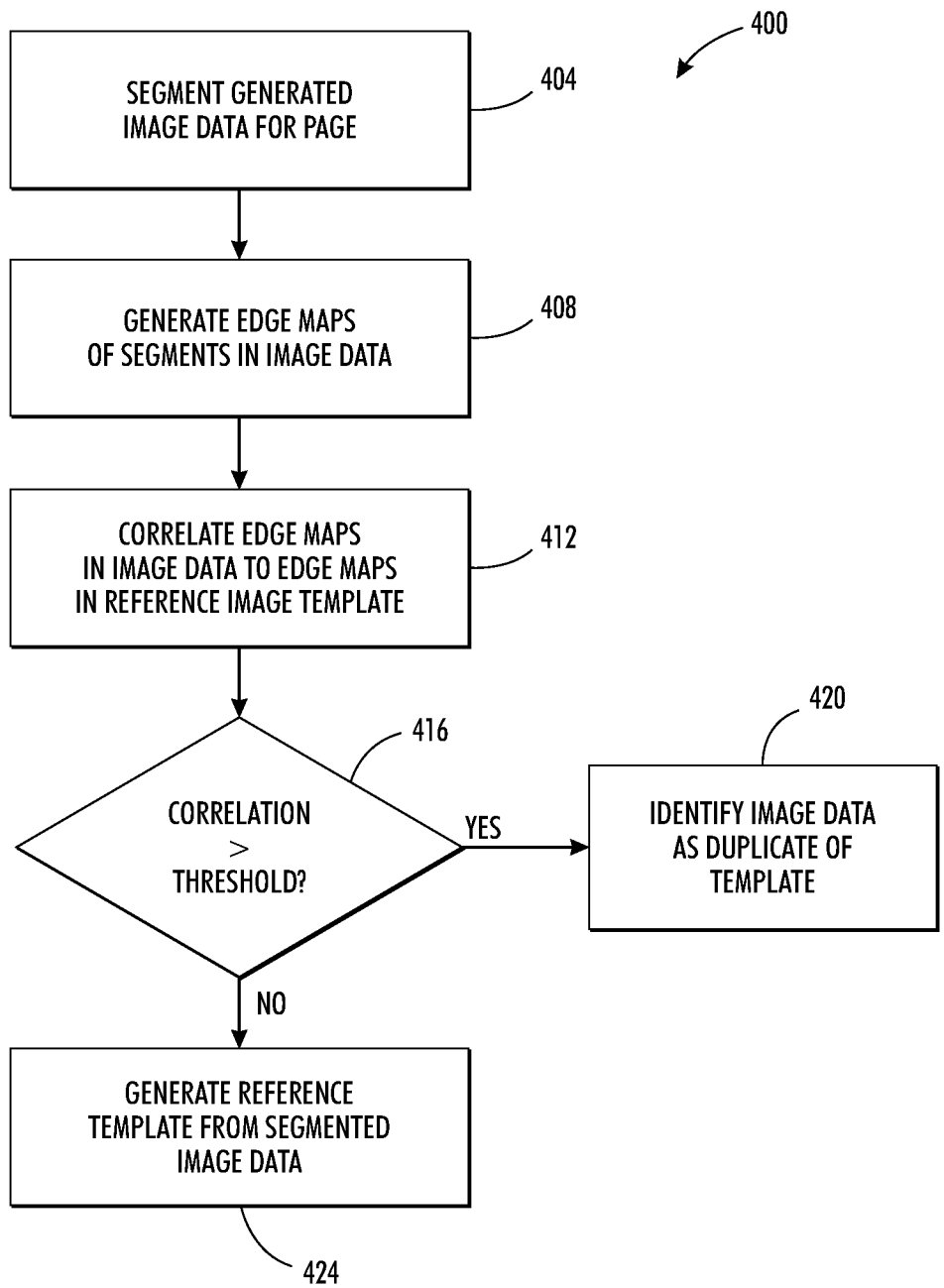
FIG. 4 is a block diagram of a process for identifying duplicate images from image data generated from printed images on an image receiving member.
Figure 6:
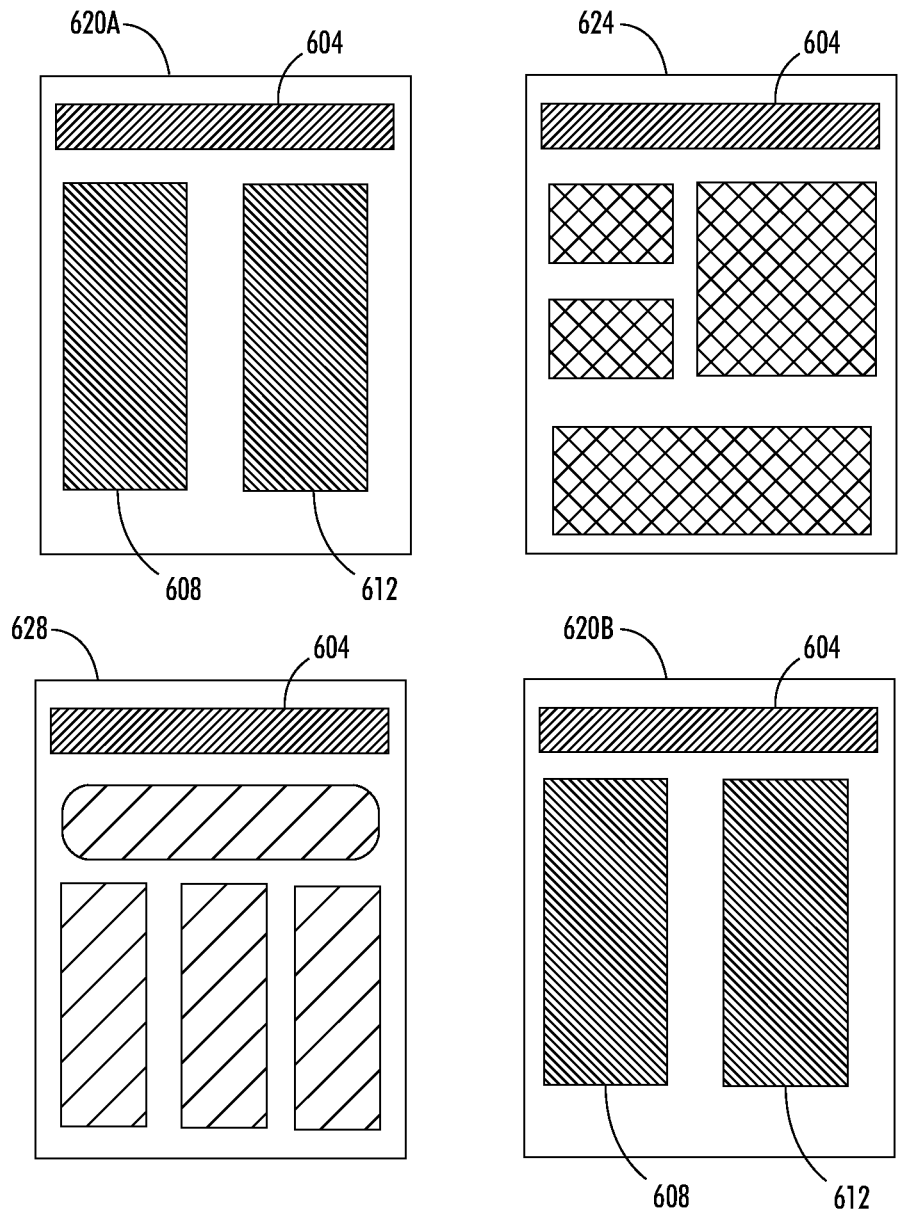
FIG. 6 is a view of multiple printed pages including sections formed in each page.

FIG. 4 depicts a process 400 for identifying duplicate images in image data generated from printed images formed on multiple pages. Process 400 begins by segmenting the generated image data that corresponds to a page in the print job (block 404). The generated image data may be the same image generated for each printed page during processes 100 and 200 described above. The segmentation process may include a component analysis or entropy analysis to group similar areas of a page together into one or more segments. The segmentation process may operate in a single channel of multi-channel image data. For example, process 400 may generate image segments in image data with an L*a*b* using an entropy analysis of the L* channel. In images including printed text, the entropy analysis may include generating entropy values for text in the image as well. Various morphological processes may be used to remove fragments and other artifacts from each segment. As seen in FIG. 6, pages 620A, 624, and 628 include various segments, such as segment 604, 608, and 612 on page 620A.

Process 400 generates edge maps for each segment in the generated image data (block 408). The edge maps define the positions and arrangement of the outer boundaries of each image segment in the page. The edge maps for the segments are then correlated with edge map templates generated for one or more reference images (block 412). In one embodiment, a two dimensional correlation between the edge maps from the generated image data and the template is calculated. If the two-dimensional correlation produces a value that is above a preset threshold (block 416), the layout of the incoming image is identified as a duplicate of one of the templates (block 420). The threshold used in the correlation may be selected with reference to the confidence of a scanning process, such as the amount of noise in the generated image data and possible skew and rotation of the image receiving member as the image receiving member is being scanned. In the presence of scanning errors, such as skew, the skew error is accounted for when performing the two dimensional correlation. If the skew is detected using skew detection methods known to the art, the scanned image data may be processed to compensate for the skew before the template matching is being performed. In the example shown in FIG. 6, page 620A is the first page of a three page document including pages 624 and 628. Duplicate page 620B includes the same segments 604, 608, and 612 that have a two-dimensional correlation exceeding the predetermined threshold value.

If the two-dimensional correlation is below the threshold for any of the stored templates (block 416), then the incoming image is a new image and its edge map can then be stored as a new template (block 424). In FIG. 6, pages 624 and 628 would fall below the threshold value when compared to a reference image data template for corresponding to page 620A. In one embodiment, a printer stores the edge map templates in a memory instead of the full generated image data for each page to reduce memory usage.

Process 400 is merely an example of one method for identifying duplicate images. Any alternative method suitable for identifying duplicate images generated during a print job may also be used. In some printing applications, the image data for each pixel in one segment or the entire image may be compared. The full image analysis may be performed for each region following the layout comparison. In another embodiment, process 400 may identify an individual image segment that corresponds to a reference template, even if other image segments on a media page do not correspond to the template. In the example of FIG. 6, segment 604 has the same size, shape, and edge map for each of media pages 620A, 624, 628, and 620B. The segment 604 may be identified as a duplicate image, even if the other image segments of the larger images do not duplicate the images on other pages. This segmentation may be useful in identifying transient image defects in documents that have duplicated sections on some or all of the pages in a print job, such as titles or headers present in each page of a print job.

The foregoing methods for identifying transient defects in printed images may be conducted using image data generated from various printed images formed on an image receiving member, including images that the printer forms when executing print jobs. The image data for the reference images may be provided with a print job, or may be generated without the need for a priori knowledge of the content of the images. Consequently, the foregoing methods do not require a separate test pattern image to be formed on the image receiving member in order to identify transient image defects, although certain test patterns known to the art may be suitable for use with the foregoing methods.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method of detecting defects in printed images comprising:
    operating a printer with a controller to form a first printed image and a second printed image on at least one image receiving member, the second printed image being a duplicate of the first printed image;
    generating with optical detectors first image data corresponding to the first printed image;
    generating with optical detectors second image data corresponding to the second printed image;
    generating with the controller at least one segment from the first image data corresponding to the first printed image;
    identifying with the controller sizes and shapes of edges for each segment in the first image data corresponding to the first printed image;
    generating with the controller at least one segment from the second image data corresponding to the second printed image;
    identifying with the controller sizes and shapes of edges for each segment in the second image data corresponding to the second printed image;
    identifying with the controller the second printed image as a duplicate of the first printed image in response to a correlation of the sizes and shapes of edges in each segment of the first image data corresponding to the first printed image to the sizes and shapes of edges in each segment of the second image data corresponding to the second printed image exceeding a predetermined threshold;
    generating with the controller difference data corresponding to a difference between the first image data corresponding to the first printed image and the second image data corresponding to the second printed image; and
    identifying with the controller a defect in the second printed image from the difference data.

2. The method of claim 1, the generation of the difference data further comprising:
    generating with the controller delta image data that corresponds to a difference between the first image data and the second image data.

3. The method of claim 1, the generation of the difference data further comprising:
    generating with the controller a first image quality measurement of the first image data corresponding to the first printed image;
    generating with the controller a second image quality measurement of the second image data corresponding to the second printed image; and
    generating with the controller the difference data with reference to a difference between the first image quality measurement and the second image quality measurement.

4. The method of claim 1 further comprising:
    generating with the controller a first plurality of one dimensional profiles with reference to the first image data; and
    generating with the controller a second plurality of one dimensional profiles with reference to the second image data.

5. The method of claim 1, the generation of the first image data further comprising:
    filtering the first image data; and
    filtering the second image data.

6. The method of claim 1, wherein the first printed image is formed as one printed image in a plurality of printed images, and the second printed image is formed as one printed image in a second plurality of printed images and each printed image in the second plurality of printed images is a duplicate of the one printed image in the first plurality of printed images.

7. The method of claim 1, wherein the image data corresponding to the first printed image is used to identify defects in a plurality of duplicate printed images.

8. The method of claim 1, wherein the first printed image forms a portion of a first larger printed image on a first page, and the second printed image forms a portion of a second larger printed image on a second page and the second larger image is not a duplicate of the first larger image.

9. A system for identifying image defects in images produced by a printer comprising:
    a printer configured to form a first printed image and a second printed image on at least one image receiving member, the second printed image being a duplicate of the first printed image;
    an optical detector configured to generate digital image data corresponding to the second printed image from light reflected by the second printed image; and
    a controller operatively connected to the optical detector, the controller being configured:
    to generate image data corresponding to a difference between image data corresponding to the first printed image and the image data corresponding to the second printed image;

generate at least one segment from the image data corresponding to the first printed image, identify sizes and shapes of edges for each segment in the image data corresponding to the first printed image;

generate at least one segment from the image data corresponding to the second printed image;

identify sizes and shapes of edges for each segment in the image data corresponding to the second printed image; and identify the second printed image as being a duplicate of the first printed image in response to a correlation of the sizes and shapes of edges in each segment of the image data of the first printed image to the sizes and shapes of edges in each segment of the image data corresponding to the second printed image exceeding a predetermined threshold; and to identify an image defect in the second printed image from the image data corresponding to the difference between the image data corresponding to the first printed image and the image data corresponding to the second printed image.

10. The system of claim 9, wherein the image data corresponding to the first image is generated by the optical detector from light reflected from the first printed image.

11. The system of claim 10, wherein the first printed image is formed as one image in a plurality of printed images on the at least one image receiving member, and the second printed image is formed as one printed image in a second plurality of printed images on the at least one image receiving member, and each printed image in the second plurality of printed images is a duplicate of the one printed image in the first plurality of images.

12. The system of claim 9, wherein the first printed image forms a portion of a first larger image on a first page, and the second printed image forms a portion of a second larger image on a second page and the second larger image is not a duplicate of the first larger image.

* * * * *